UNITED STATES PATENT OFFICE.

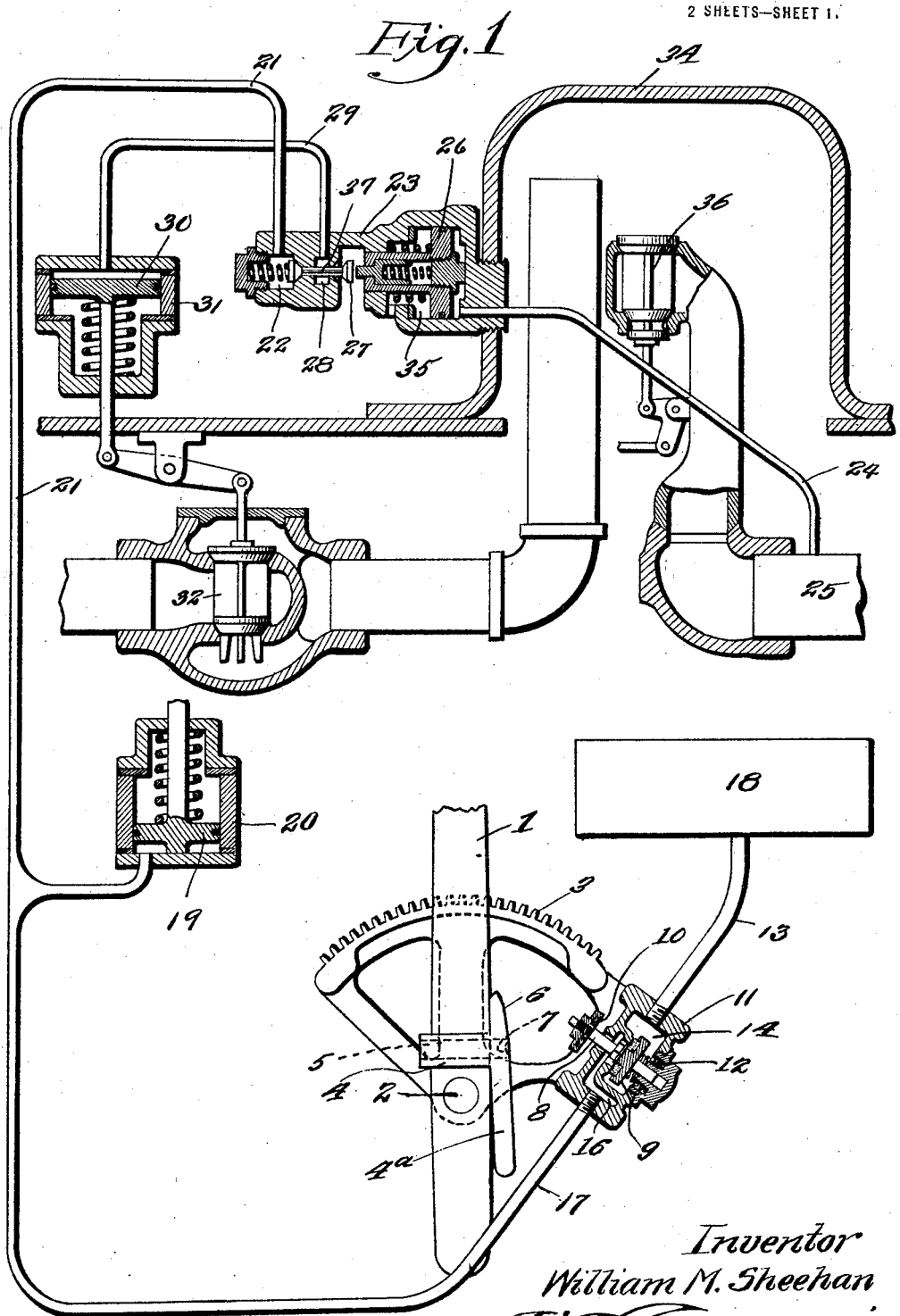

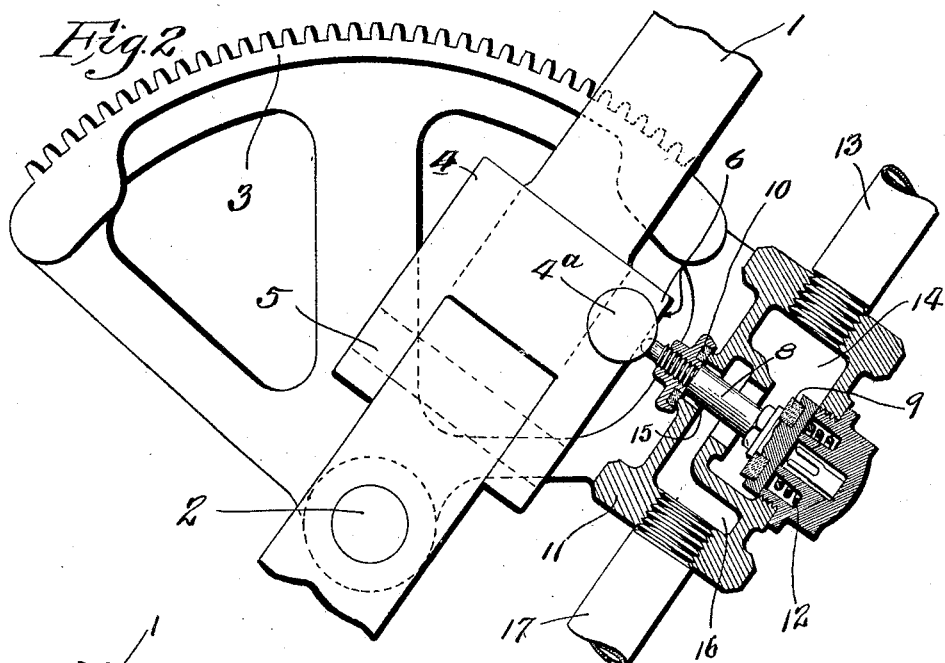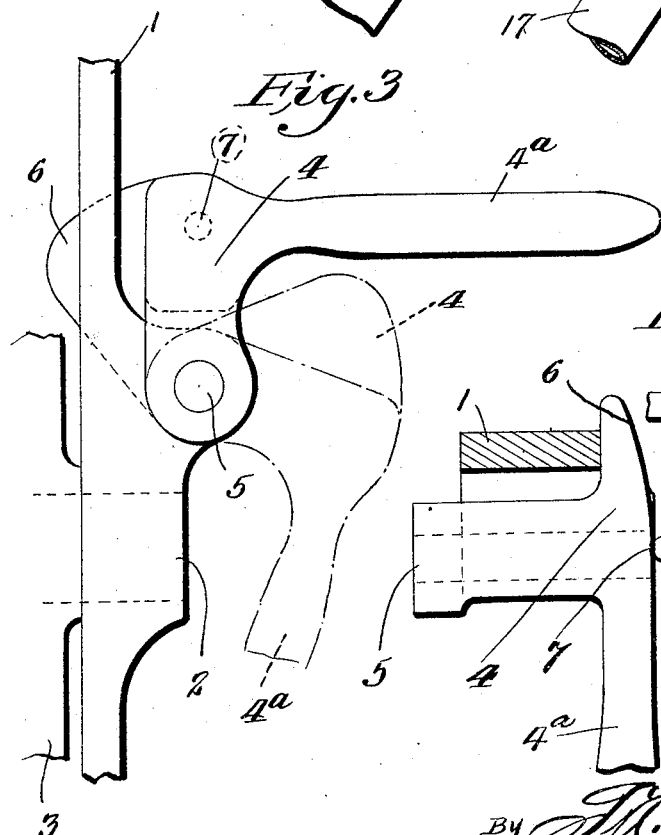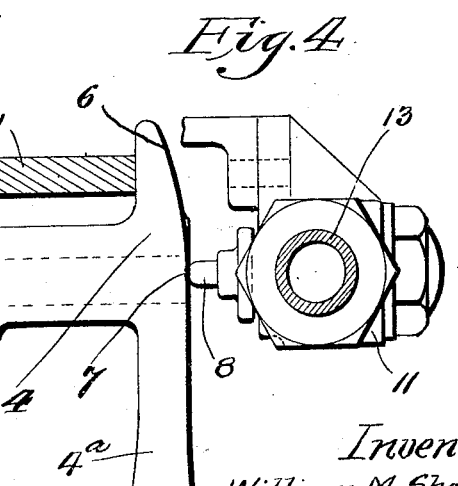

WILLIAM M. SHEEHAN, OF ST. LOUIS, MISSOURI, ASSIGNOR, BY MESNE ASSIGNMENTS, TO HOWARD L. INGERSOLL.

CONTROL OF BOOSTER MOTORS FOR LOCOMOTIVES.

1,413,688.  Specification of Letters Patent.  Patented Apr. 25, 1922.

Application filed July 14, 1919, Serial No. 310,701. Renewed November 8, 1920. Serial No. 422,701.

*To all whom it may concern:*

Be it known that I, WILLIAM M. SHEEHAN, a citizen of the United States, residing at the city of St. Louis and State of Missouri, have invented a certain new and useful Improvement in Control of Booster Motors for Locomotives, of which the following is a full, clear, and exact description, such as will enable others skilled in the art to which it appertains to make and use the same, reference being had to the accompanying drawings, forming part of this specification.

My invention relates to apparatus for controlling the operation of auxiliary or "booster motors" as employed on railway locomotives for aiding the main driving mechanism in starting the locomotive and driving the same at relatively low speeds; and the invention is concerned more specifically with a booster motor controlling apparatus such as is shown in the application of Howard L. Ingersoll for booster motor for locomotives filed May 22, 1919, Serial No. 299,037 (patented as Patent No. 1,339,395 on May 11, 1920), in which the booster is made an effective driving factor through operation of the usual controlling members of the main driving mechanism, to-wit, the reverse and main throttle levers, but conditioned upon the position of a controlling member which the engineman may manipulate or not at his discretion. The control system is, therefore, in a sense semi-automatic in its operation, automatic in so far as the booster motor is cut in or out through the movements of the locomotive controlling devices but volitional in so far as the actuation of the booster is also dependent upon an act of the engine man independent of his manipulation of the locomotive control devices.

In the apparatus shown in the Ingersoll system above referred to the control of the booster is through the operation of certain compressed air operative devices, the supply of pressure fluid to which is governed by a valve that is opened when the reverse lever is put into an extreme forward position, the position customary when the locomotive is started; and the apparatus includes a dog which normally stands in the path of the lever to prevent the lever from being "put into the corner," but which may be moved out of the way of said lever by a foot treadle when the lever is hooked up to shorten the locomotive valve movement. When this hooking up takes place, which is ordinarily when the locomotive attains such a speed as makes it desirable to cut out the booster, the governing valve closes and brings about the disconnection of the booster from the locomotive axle which it is intended to drive and shuts off motive power from the booster. At the same time the dog automatically moves back into the path of the lever so that the engine man cannot, by inadvertently putting the reverse lever into the corner, bring about a cutting in of the booster.

My invention has to do with this feature of the control apparatus whereby the booster cannot be put into operation except by a deliberate act on the part of the engine man, and its object is to provide a novel and improved controlling device which may be operated by hand instead of by the foot lever of the Ingersoll patent, which is returned by gravity to its normal position, that is, the position preventing the reverse lever from operating the governing valve of the booster control system and which is capable of manipulation to close and reopen said governing valve without moving the reverse lever from its extreme position. Its capacity in this latter respect allows the engine man complete freedom in controlling the booster so that he may cut the booster in or cut it out at any time, as circumstances may require, provided only that the reverse lever is in the customary position for the starting or slow propulsion of the locomotive.

The invention is illustrated, in a preferred embodiment, in the accompanying drawings wherein—

Fig. 1 is a diagrammatic view of the booster control apparatus shown in the Ingersoll patent above referred to but modified in accordance with the provisions of my invention.

Fig. 2 is a fragmentary side elevation of a part of the locomotive reverse lever and the booster motor governing valve, and associated parts, the valve being shown in section.

Fig. 3 is a fragmentary elevational view of the parts shown in Fig. 2, taken at right angles to the plane of said Fig. 2, the broken lines illustrating the inoperative position of the manually actuated controlling lever, and Fig. 4 is a sectional plan of the parts shown in Figs. 2 and 3.

In the drawings, 1 designates the reverse lever of the locomotive which is pivoted at 2 to the toothed holding quadrant 3. 4 designates the manually operated controlling lever which is provided with a handle 4ª and is forked and pivoted by pivot pin 5 to the reverse lever. The member 4 is formed preferably with a cam face 6 and with a slight depression 7.

8 designates the stem of the governing valve which controls the supply of pressure fluid, preferably compressed air, to the apparatus for putting the booster motor into and out of operation, the stem carrying a valve 9 for effecting the control just mentioned and a valve 10, the function of which is to prevent leakage around stem 8. 12 is a spring tending to hold valve 9 closed. 13 is a pipe leading from an air reservoir 18 to the chamber 14 of the valve casing 11 in which valve stem 8 is located. 16 is an outlet chamber in casing 11 to which is connected a pipe 17. This pipe leads to an air motor comprising a piston 19 and cylinder 20 for entraining the booster motor with one of the axles of the locomotive. A pipe 21, which is a branch of pipe 17, leads to a chamber 22 in a valve casing 23 fixed to the steam dome 34 of the locomotive boiler. Within cylinder 35 in this casing is arranged a piston 26 actuated by steam which passes from the locomotive dry pipe 25 through a pipe 24 when the main throttle 36 of the locomotive is open. The piston 26 is adapted to actuate a double valve 37 controlling the flow of air from chamber 22 to a chamber 28 in valve casing 23 and also the exhaust from the latter chamber. A pipe 29 leads from chamber 28 to a compressed air motor consisting of piston 30 and cylinder 31 which operates the booster throttle valve 32.

The apparatus described is the same as shown in the Ingersoll patent above mentioned except so far as concerns the hand operated controlling member 4.

The operation of the apparatus is as follows: The normal position of the hand operated controlling device is that shown in Fig. 1 and indicated by the broken lines in Fig. 3. The extremity of stem 8 of the governing valve is arranged so as to be out of reach of the reverse lever, even when the latter is put into the corner unless the member 4 be turned from its normal position (broken lines of Fig. 3) to its operative position (full lines of Fig. 3). When in the latter position the member 4 bears against the valve stem 8 and opens valve 9 against its spring 12. Compressed air flows from the reservoir 18 through pipes 13, valve casing 11, pipe 17 and into the air motor 19, 20 which thereupon entrains the booster motor with the locomotive axle. Air at the same time passes through pipe 21 into chamber 22 of the valve casing 23 where it is blocked by valve 37. As soon, however, as the main throttle valve 36 of the locomotive is open steam will pass from the main dry pipe 25 through pipe 24 to cylinder 35 and piston 26 will be forced to the left moving valve 37 to admit air from chamber 22 to chamber 28 and thence through pipe 29 to the motor 30, 31 which will thereupon open the booster throttle valve 32.

When the reverse lever is hooked up valve 9 will close and the booster will be put out of operation. The hand operated controlling member 4 falls to its normal position by gravity as soon as the retraction of the lever moves it out of contact with valve stem 8. In order to cut in the booster again the engine man must not only put the reverse lever in the corner but also swing the controlling member 4 to its upper position. It may happen that the engine man will wish to cut out the booster motor while the reverse lever is in the corner. This can be done by moving member 4 from its interposed position between the reverse lever and valve stem 8. He may cut the booster motor in again, without moving the reverse lever, by raising the controlling member 4, in which case the cam surface 6 thereon is brought to bear against the end of the valve stem. The depression 7 is designed to receive the end of the valve stem 8. If spring 12 is sufficiently strong such depression will be unnecessary.

I claim:

1. A controlling device for booster motors for locomotives comprising a moving part in the controlling mechanism for the main locomotive, said moving part having a movable element which is normally out of operative position, said element being operable at the volition of the operator, and a valve juxtaposed to the path of movement of said moving part and operable by said element only when said moving part is in its extreme position.

2. In controlling mechanism for booster motors for locomotives, the combination of an air controlling system for the booster motor, a booster motor, a controlling mechanism for the main locomotive which includes a movable part, and a gravitating element on said movable part which may be manipulated at the volition of the operator whereby the booster motor may be placed under or out of control of the moving part in the controlling mechanism for the main locomotive at the will of the operator.

3. In a device of the character described, the combination of a reverse lever, a member pivotally mounted thereon, a spring pressed plunger normally out of the path of movement of said member, and manipulative means connected to said member whereby it may operate said spring pressed plunger only when said reverse lever is in an extreme position.

4. In a device of the character described, the combination of a reverse lever of a locomotive and a spring pressed valve operating plunger, a member pivotally mounted on said reverse lever and adapted to be moved into and out of the path of said valve operating plunger, said member having a cam face by which it may operate said valve operating plunger only when the reverse lever is in its extreme position.

5. In combination with the main driving mechanism of a locomotive, its reverse lever, and a booster motor; fluid pressure operated controlling apparatus for the booster motor comprising a governing valve adapted to be actuated by the reverse lever, and a hand operated controlling element the position of which conditions the actuation of the governing valve by said reverse lever.

6. In combination with the main driving mechanism of a locomotive, its reverse lever, and a booster motor; fluid pressure operated controlling apparatus for the booster motor comprising a governing valve adapted to be opened by the reverse lever when the latter is in an extreme position, and a hand operated controlling element, the position of which conditions the actuation of the governing valve by said reverse lever.

7. In combination with the main driving mechanism of a locomotive, its reverse lever, and a booster motor; fluid pressure operated controlling apparatus for the booster motor comprising a governing valve adapted to be opened by the reverse lever when the latter is in an extreme position, and a controlling element, the position of which conditions the actuation of the governing valve by the reverse lever and which is movable to and from said position of actuation while the reverse lever is in its extreme position.

8. In combination with the main driving mechanism of a locomotive, its reverse lever, and a booster motor; fluid pressure operated controlling apparatus for the booster motor comprising a governing valve adapted to be opened by the reverse lever when the latter is in an extreme position, and a controlling element, the position of which conditions the actuation of the governing valve by the reverse lever and which is movable at the will of the engine man to and from said position of actuation while the reverse lever is in its extreme position.

9. In combination with the main driving mechanism of a locomotive, its reverse lever, and a booster motor; fluid pressure operated controlling apparatus for the booster motor comprising a governing valve adapted to be opened by the reverse lever when the latter is in an extreme position, and a controlling element, the position of which conditions the actuation of the governing valve by the reverse lever and which is movable by hand to and from said position of actuation while the reverse lever is in its extreme position.

10. In combination with the main driving mechanism of a locomotive, its reverse lever and booster motor; a fluid pressure operated controlling apparatus for the booster motor comprising a governing valve having an actuating part which stands adjacent to but out of contact with the reverse lever when the latter is in an extreme position, and a controlling element adapted to be interposed between the lever and said actuating part to effect the actuation of said valve.

11. In combination with the main driving mechanism of a locomotive, its reverse lever and booster motor; a fluid pressure operated controlling apparatus for the booster motor comprising a governing valve having an actuating part which stands adjacent to but out of contact with the reverse lever when the latter is in an extreme position, and a controlling element carried by said lever and adapted to be interposed between the lever and said actuating part to effect the actuation of said valve.

12. In combination with the main driving mechanism of a locomotive, its reverse lever and booster motor; a fluid pressure operated controlling apparatus for the booster motor comprising a governing valve having an actuating part which stands adjacent to but out of contact with the reverse lever when the latter is in an extreme position, and a controlling element pivoted to said lever and adapted to be interposed between the lever and said actuating part to effect the actuation of said valve.

13. In combination with the main driving mechanism of a locomotive, its reverse lever and booster motor; a fluid pressure operated controlling apparatus for the booster motor comprising a governing valve having an actuating part which stands adjacent to but out of contact with the reverse lever when the latter is in an extreme position, and a controlling element pivoted to said lever, provided with an operating handle and adapted to be interposed between the lever and said actuating part to effect the actuation of said valve.

14. In combination with the main driving mechanism of a locomotive, its reverse lever and a booster motor; a fluid pressure operated controlling apparatus for the booster motor comprising a governing valve having a stem in line with but out of range of movement of the reverse lever, and a controlling member adapted to be interposed between the reverse lever and valve stem to effect the actuation of the valve when the reverse lever is in an extreme position.

15. In combination with the main driving mechanism of a locomotive, its reverse lever and a booster motor; a fluid pressure operated controlling apparatus for the booster motor comprising a governing valve having a stem in line with but out of range of movement of the reverse lever, and a controlling member adapted to be interposed between the reverse lever and valve stem to effect the actuation of the valve when the reverse lever is in an extreme position, said member formed with a cam surface for engagement with said valve stem, whereby the valve may be actuated by movement of the controlling lever while the reverse lever is in an extreme position.

16. In combination with the main driving mechanism of a locomotive, its reverse lever and a booster motor; a fluid pressure actuated controlling apparatus for the booster motor comprising a governing valve having a stem in line with but beyond the range of movement of the reverse lever, and a controlling member pivoted to the reverse lever and adapted to be rocked so as to be interposed between said lever and said valve stem, when the lever is in an extreme position, said member being adapted to move by gravity out of said interposed position when the lever is hooked up and being formed with a cam surface for engagement with the valve stem, for the purpose described.

17. The combination with the main driving mechanism of a locomotive, its controlling means and a booster motor; of controlling apparatus for the booster motor operated by the controlling means of the main driving mechanism and comprising a hand operated mechanism, the position of which conditions the actuation of the booster controlling apparatus.

18. The combination with the main driving mechanism of a locomotive, its controlling means and a booster motor; of controlling apparatus for the booster motor operated by the controlling means of the main driving mechanism and comprising a member, the position of which conditions the actuation of the booster controlling apparatus and which is adapted to be moved, at the will of the operator, into and out of its said position of actuation.

19. The combination with the main driving mechanism of a locomotive, its controlling means and a booster motor; of controlling apparatus for the booster motor comprising an actuating element adapted to be moved by the moving part of the controlling means of the main driving mechanism when said part reaches an extreme position, and a member adapted to be interposed between said moving part and actuating element which conditions the effective engagement of said part with said element.

20. The combination with the main driving mechanism of a locomotive, its controlling means and a booster motor; of controlling apparatus for the booster motor comprising an actuating element adapted to be moved by the moving part of the controlling means of the main driving mechanism when said part reaches an extreme position, and a member adapted to be interposed between said moving part and actuating element which conditions the effective engagement of said part with said element, said member being movable into and from said position when the moving part is in its said extreme position.

21. The combination with the main driving mechanism of a locomotive, its controlling means and a booster motor; of controlling apparatus for the booster motor comprising an actuating element adapted to be moved by the moving part of the controlling means of the main driving mechanism when said part reaches an extreme position, and a member adapted to be interposed between said moving part and actuating element which conditions the effective engagement of said part with said element, said member being adapted to move automatically from said interposed position when said moving part is moved away from its extreme position.

22. The combination with the main driving mechanism of a locomotive, its controlling means and a booster motor; of controlling apparatus for the booster motor comprising an actuating element adapted to be moved by the moving part of the controlling means of the main driving mechanism when said part reaches an extreme position, and a member adapted to be interposed between said moving part and actuating element which conditions the effective engagement of said part with said element, said member being pivotally mounted on the moving part and adapted to move automatically from said interposed position when the moving part is moved away from its extreme position.

23. In combination with the main driving mechanism of a locomotive, its reverse lever, and a booster motor; fluid pressure operated controlling apparatus for the booster motor comprising a governing valve adapted to be opened by the reverse lever when the latter is in an extreme position, and a controlling element, the position of which conditions the actuation of the governing valve by the reverse lever and which is movable at the will of the engine man to and from said position of actuation while the reverse lever is in its extreme position, and which is adapted to automatically move from its operative position when the reverse lever is moved from its said extreme position.

24. In combination with the main driving mechanism of a locomotive, its reverse lever and booster motor; a fluid pressure operated controlling apparatus for the booster motor comprising a governing valve having an actuating part which stands adjacent to but out of contact with the reverse lever when the latter is in an extreme position, and a controlling element adapted to be interposed between the lever and said actuating part to effect the actuation of said valve, said controlling element being supported so that it automatically moves away from said interposed position when the lever is moved from its extreme position.

25. In combination with the main driving mechanism of a railway locomotive, its controlling means and a booster motor; controlling apparatus for the booster motor comprising an actuating element arranged so as to be adjacent to but out of contact with a moving part of the controlling means for the main driving mechanism when said moving part is in an extreme position, and a member pivoted to said moving part adapted to be interposed between said part and the actuating element, and formed with a surface to engage said actuating element whereby it may be moved to and from said interposed position when the moving part is in its extreme position.

In testimony whereof I hereunto affix my signature this 11th day of July, 1919.

WILLIAM M. SHEEHAN.